(12) United States Patent
Widmer et al.

(10) Patent No.: US 10,495,773 B2
(45) Date of Patent: Dec. 3, 2019

(54) FOREIGN OBJECT DETECTION FOR FERROMAGNETIC WIRE-LIKE OBJECTS

(71) Applicant: WiTricity Corporation, Watertown, MA (US)

(72) Inventors: Hans Peter Widmer, Wohlenschwil (CH); Andreas Daetwyler, Muhen (CH); Lukas Sieber, Olten (CH)

(73) Assignee: WiTricity Corporation, Watertown, MA (US)

(*) Notice: Subject to any disclaimer, the term of this patent is extended or adjusted under 35 U.S.C. 154(b) by 267 days.

(21) Appl. No.: 15/498,094

(22) Filed: Apr. 26, 2017

(65) Prior Publication Data

US 2018/0313970 A1 Nov. 1, 2018

(51) Int. Cl.
*G01R 27/26* (2006.01)
*G01V 3/10* (2006.01)

(52) U.S. Cl.
CPC .................................. *G01V 3/101* (2013.01)

(58) Field of Classification Search
CPC . G01V 3/101; G01V 3/10; H02J 50/60; H02J 50/70; G01R 27/02
USPC ........................................................ 324/222
See application file for complete search history.

(56) References Cited

U.S. PATENT DOCUMENTS

| | | | |
|---|---|---|---|
| 5,189,366 A * | 2/1993 | Mayo | G01N 27/023 324/225 |
| 5,642,050 A * | 6/1997 | Shoemaker | G01V 3/105 324/232 |
| 6,762,604 B2 | 7/2004 | Le | |
| 7,019,519 B2 | 3/2006 | Le | |
| 9,377,287 B2 | 6/2016 | Tian et al. | |
| 9,476,736 B2 | 10/2016 | Arisawa et al. | |
| 2012/0181875 A1* | 7/2012 | Wechlin | B60L 3/00 307/104 |
| 2013/0264887 A1* | 10/2013 | Arisawa | G01D 5/2006 307/104 |
| 2014/0111019 A1* | 4/2014 | Roy | G01V 3/081 307/104 |
| 2016/0187520 A1 | 6/2016 | Widmer et al. | |

* cited by examiner

*Primary Examiner* — Melissa J Koval
*Assistant Examiner* — Courtney G McDonnough
(74) *Attorney, Agent, or Firm* — Colby Nipper PLLC

(57) ABSTRACT

Systems and methods are described for improving foreign object detection for ferromagnetic wire-like objects. In particular, aspects include increasing FOD sensitivity using at least one inductive sense loop in response to detecting a change in resistance that is substantially equal to the change in reactance of a sense coil. By increasing the FOD sensitivity, objects such as ferromagnetic wire-like objects can be detected that are potentially hazardous objects. Detecting these potentially hazardous objects that were previously undetectable can reduce the chances of damage to surrounding materials or harm to humans.

29 Claims, 9 Drawing Sheets

FOREIGN OBJECT DETECTION FOR FERROMAGNETIC WIRE-LIKE OBJECTS

FIELD

The present disclosure relates generally to wireless power transfer, and more specifically to devices, systems, and methods for detecting foreign ferromagnetic wire-like objects.

BACKGROUND

Wireless Electronic Vehicle Charging (WEVC) from a ground-based unit to a vehicle-mounted pick-up unit generally requires foreign object detection (FOD). Conventional FOD systems can fail to detect certain small ferromagnetic objects having a length substantially longer than a thickness, such as nails, pins, steel wire pieces, staples, and so forth. These small objects have the potential of reaching hazardous temperatures if exposed to magnetic fields in the millitesla range and with an orientation substantially in a direction of the magnetic field.

Because of these challenges, inductive ferromagnetic sensing (IFS) has been used to detect ferromagnetic objects. The achievable sensitivity of IFS, however, is limited to paperclip-size objects, and are not sufficient for tiny steel wire pieces, fixing pins, nails, and so forth. Thermal sensing using an infrared (IR) camera is yet another alternative solution used to detect ferromagnetic objects. IR sensing, however, cannot accurately detect small hot objects shadowed by another cold object.

SUMMARY

Systems and methods are described for improving foreign object detection for ferromagnetic wire-like objects. In particular, aspects include increasing FOD sensitivity using at least one inductive sense loop in response to detecting a change in resistance that is substantially equal to the change in reactance of a sense coil. By increasing the FOD sensitivity, objects such as ferromagnetic wire-like objects can be detected that are potentially hazardous objects. Detecting these potentially hazardous objects that were previously undetectable can reduce the chances of damage to surrounding materials or harm to humans.

DETAILED DESCRIPTION

Wirelessly transferring power involves transferring energy through electric fields, magnetic fields, electromagnetic fields, or otherwise using a transmitter to a receiver without the use of physical electrical conductors (e.g., power may be transferred through free space). The power output into an electro-magnetic field (e.g., a magnetic field) may be received, captured by, or coupled by a "receiving coupler" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
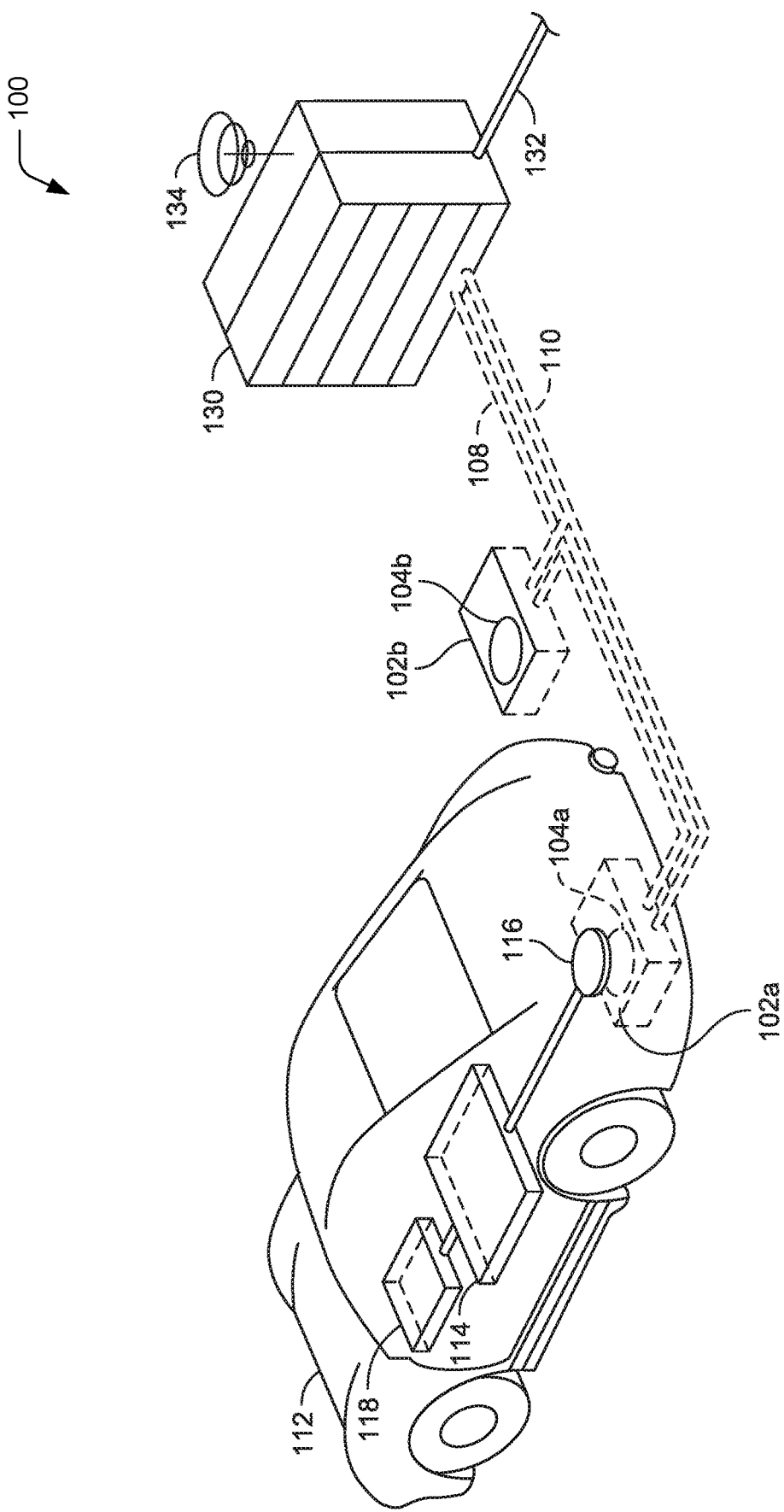
FIG. 1 illustrates a diagram of an example wireless power transfer system for charging an electric vehicle.

FIG. 1 is a diagram of an example wireless power transfer system 100 for charging an electric vehicle 112, in accordance with some exemplary implementations. The wireless power transfer system 100 enables charging of an electric vehicle 112 while the electric vehicle 112 is stationary so as to efficiently couple with a base wireless charging system 102a. Spaces for two electric vehicles are illustrated in a parking area to be parked over corresponding base wireless charging system 102a and 102b. In some aspects, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base system coupler 104a and 104b, respectively, for wirelessly transferring power. The electric vehicle 112 may include a battery unit 118, an electric vehicle coupler 116, and an electric vehicle wireless charging system 114. In some other aspects (not shown in FIG. 1), base system couplers 104a or 104b may be stand-alone physical units and are not part of the base wireless charging system 102a or 102b. The electric vehicle coupler 116 may interact with the base system coupler 104a for example, via a region of the electromagnetic field generated by the base system coupler 104a.

In some aspects, the electric vehicle coupler 116 may receive power when the electric vehicle coupler 116 is located in an energy field produced by the base system coupler 104a. The field corresponds to a region where energy output by the base system coupler 104a may be captured by an electric vehicle coupler 116. For example, the energy output by the base system coupler 104a may be at a level sufficient to charge or power the electric vehicle 112. In some cases, the field may correspond to the "near field" of the base system coupler 104a. The near-field may correspond to a region in which there are strong reactive fields resulting from the currents and charges in the base system coupler 104a that do not radiate power away from the base system coupler 104a. In some cases, the near-field may correspond to a region that is within about ½π of wavelength of the base system coupler 104a (and vice versa for the electric vehicle coupler 116) as will be further described below.

The local distribution center 130 may be configured to communicate with external sources (e.g., a power grid) via a communication backhaul 134, and with the base wireless charging system 102a via a communication link 108.

In some aspects the electric vehicle coupler 116 may be aligned with the base system coupler 104a and, therefore, disposed within a near-field region simply by the driver positioning the electric vehicle 112 such that the electric vehicle coupler 116 is sufficiently aligned relative to the base system coupler 104a. Alignment may be considered sufficient when an alignment error has fallen below a tolerable value. In other aspects, the driver may be given visual, auditory, or tactile feedback, or combinations thereof to determine when the electric vehicle 112 is appropriately positioned for wireless power transfer. In yet other aspects, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering wheel, radar sensors (e.g., ultrasonic sensors), and intelligence for safely maneuvering and adjusting the electric vehicle. In still other aspects, the electric vehicle and/or the base wireless charging system 102a may have functionality for mechanically displacing and moving the couplers 116 and 104a, respectively, relative to each other to more accurately orient or align them and develop sufficient and/or otherwise more efficient coupling between the couplers 116 and 104a.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, stoplights, and other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Safety may be improved since manipulations with cables and connectors may not be needed, and there may be no cables, plugs, or sockets to be exposed to moisture in an outdoor environment. In addition, there may be no visible or accessible sockets, cables, or plugs, thereby reducing potential vandalism of power charging devices. Further, since the electric vehicle 112 may be used as distributed storage devices to stabilize a power grid, a docking-to-grid solution may be used to increase availability of vehicles for Vehicle-to-Grid (V2G) operation.

The wireless power transfer system 100 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a transfers power to the electric vehicle 112 or the electric vehicle 112 transfers power to the base wireless charging system 102a. This capability may be useful to stabilize the power distribution grid by allowing electric vehicles to contribute power to the overall distribution system in times of energy shortfall caused by over demand or shortfall in renewable energy production (e.g., wind or solar).

Figure 2:
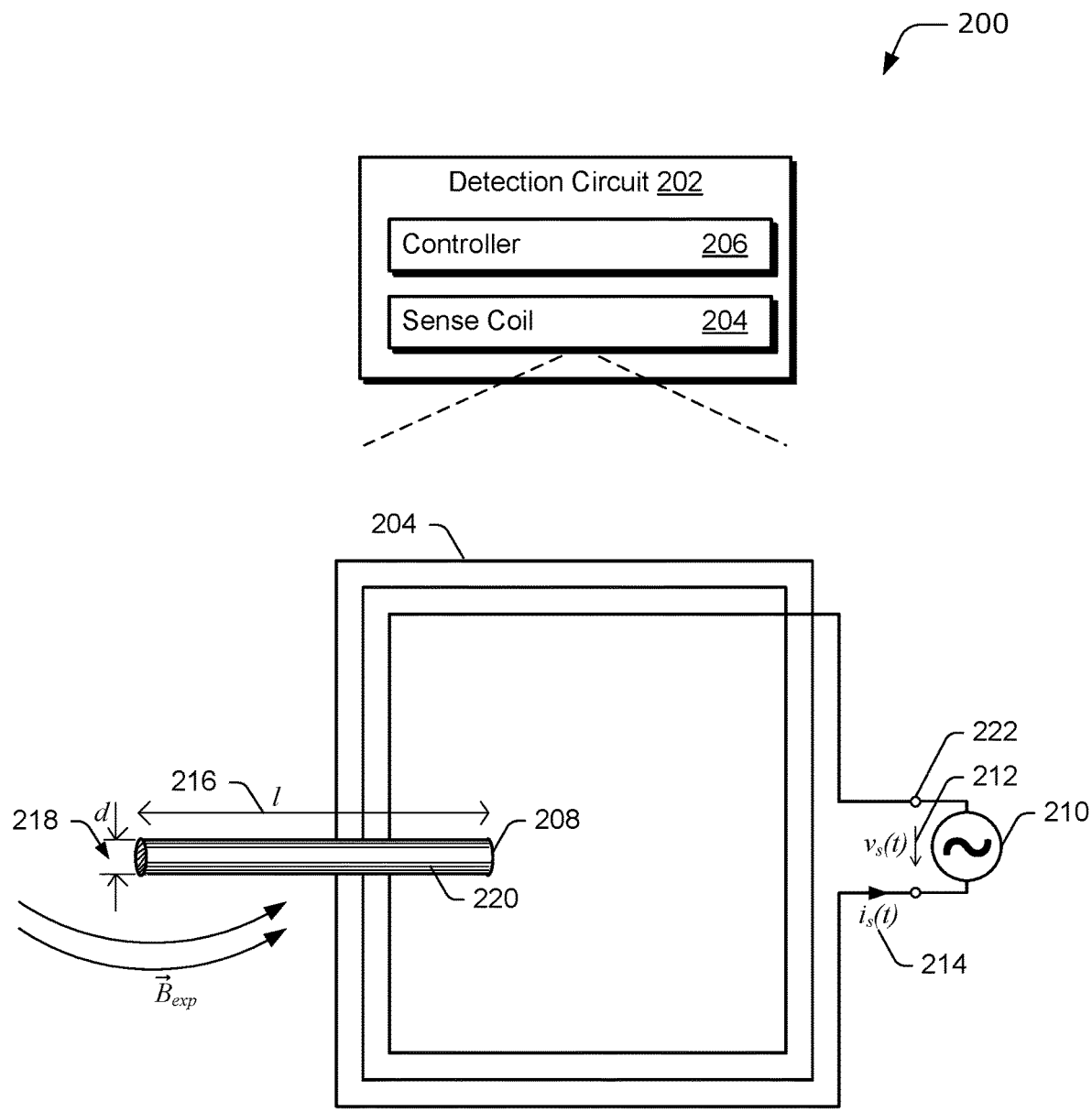
FIG. 2 illustrates an example implementation of a simplified detection circuit for detecting a ferromagnetic foreign object using an inductive sensing coil.

FIG. 2 illustrates an example implementation 200 of a simplified detection circuit 202 for detecting a ferromagnetic foreign object using an inductive sensing coil. In the illustrated example, the detection circuit 202 includes a sense coil 204 (also referred to herein as the inductive sensing coil) and a controller 206. The sense coil 204 is configured to detect a ferromagnetic foreign object, such as foreign object 208, that is exposed to an alternating magnetic field generated by an inductive power transfer system, e.g. by the coil of the base system coupler 104a. The sense coil 204 includes a coil of one or more loops of an electrically conductive material, and can be excited by a signal source 210 at a voltage $v_s(t)$ 212 and a sense frequency ($f_s$) resulting in a sense current $i_s(t)$ 214. The alternating magnetic field generated by the inductive power transfer system may generate eddy currents and hysteresis losses in the foreign object 208, which can increase the temperature of the foreign object 208.

In theory, absorbed power per surface area and thus final temperatures of ferromagnetic objects having a length l 216 substantially longer than a thickness d 218 (e.g., l>>d) are no function of their size as long as their thickness d 218 is significantly greater than a skin depth 220. Such or similar behavior can also be experimentally verified. These particular ferromagnetic objects can be referred to as "wire-like" objects, some examples of which include steel wire pieces, nails, fixing pins, and so on. The skin depth 220 refers to a penetration depth of the alternating magnetic field into the object, which relates to a volume through which electric current can flow through the object. For example, at 85 kilohertz (kHz), which is an example operating frequency of conventional WEVC systems, the skin depth of such "wire-like" objects may be in the order of 60 micrometers. This behavior of "wire-like" objects is in contrast to other form factor objects whose final temperature decreases as a function of their size, indicating that some objects too small to be detected by FOD may not exceed critical temperatures. This result is typical, however, for thicker objects, such as hexagonal nuts, bolts, and washers. Accordingly, the category of ferromagnetic objects having a length substantially greater than a diameter or thickness (e.g., a wire piece having a length of one centimeter (cm) or 20 millimeters (mm)) are considered potentially hazardous, but may be not detectable by conventional FOD systems.

Aspects assume FOD based on measuring complex impedance Z of the sense coil 204. In the presence of a conductive ferromagnetic object, the measured impedance of the sense coil 204 changes by an amount $\Delta Z$ representing a combination of a change in resistance $\Delta X$ of the sense coil 204 and a change in reactance $\Delta R$ of the sense coil 204, such that $\underline{\Delta Z} = \Delta R + j\Delta X$, where j is a constant representing the unit imaginary number (e.g., the square root of −1). When a wire-like object is substantially smaller in size than that of the sense coil 204, the wire-like object changes the resistance X and reactance R of the sense coil 204 by substantially similar amounts (e.g., within five percent), which can be considered as substantially equal amounts, with negligible effects from the wire-like object's size and various material properties, such as permeability $\mu_r$, and conductivity $\sigma$. Consequently, this wire-like type of ferromagnetic object produces an impedance with a substantially equal amount of resistive and reactive parts, such that $\Delta X \approx \Delta R$.

In the illustrated example, the sense coil 204 includes a reference impedance, which represents an impedance of the sense coil 204 when no ferromagnetic object is within sensing range (detection volume) of the sense coil 204. The reference impedance can be previously determined through calibration or a manual setting when no foreign object is present in the detection volume. In addition, the impedance is measured at a terminal 222 of the sense coil 204, intermittently or constantly. When the foreign object 208 comes in close proximity to the sense coil 204, the impedance of the sense coil 204 changes from the reference impedance by an amount $\Delta Z$, as described above. The change in impedance can then be transformed to determine an amount of change in the resistance X (real component of the impedance) and reactance R (imaginary component of the impedance) of the sense coil 204.

In aspects, the foreign object 208 can be detected by the sense coil 204 when the foreign object is exposed to a biasing static magnetic field $\vec{B}_{exp}$. The sense coil 204 may be excited by a sinusoidal signal source, e.g., signal source 210, at the voltage $v_s(t)$ 214 and the sense frequency $f_s$, resulting in the sense current $i_s(t)$ 414. The static magnetic field $\vec{B}_{exp}$ magnetically biases the foreign object 208. The foreign object's 450 electrical conductivity $\sigma(\vec{B}_{exp})$ 410 and magnetic permeability $\mu(\vec{B}_{exp})$ 412 as apparent through inductive sensing are generally functions of the biasing static magnetic field $\vec{B}_{exp}$. Since equivalent inductance and resistance are functions of $\sigma(\vec{B}_{exp})$ and $\mu(\vec{B}_{exp})$, a presence of the foreign object 450 can be potentially detected by analyzing current $i_s(t)$ in relation to source voltage $v_s(t)$ 515 and the strength of the static magnetic field $\vec{B}_{exp}$.

The foreign object 208 may be detected based on "stimulated" inductive impedance and resistance sensing. This type of sensing is based on intermittent exposure of the foreign object 208 to the static magnetic field $\vec{B}_{exp}$, which results in exposure intervals that toggle on and off and change the sense coil's 204 impedance. In at least one example, an equivalent resistance $R_{sc} + \Delta R_{sc}(t)$ of the sense coil 204 can be measured constantly and recorded over a time period. According to the known magneto-impedance effect, both inductance and resistance of the sense coil 204 decrease during the toggled-on exposure interval, and increase during a toggled-off exposure interval. These characteristics may reveal the presence of a ferromagnetic foreign object.

For instance, at least one recorded time course of resistance $R_{sc} + \Delta R_{sc}(t)$ is compared with an exposure time profile for the static magnetic field $\vec{B}_{exp}$ to determine the occurrence of the above-mentioned magneto-impedance effect. In some other aspects, this comparison is a correlation. For example, the recorded time course of the resistance $R_{sc} + \Delta R_{sc}(t)$ or other sense coil 204 characteristic is correlated with the exposure time profile for the static magnetic field $\vec{B}_{exp}$. In a further example, correlation is performed with at least one of a time-derivative, e.g., the first derivative d/dt (time gradient) of the recorded time course of at least one of an inductive sense coil's 204 characteristics.

In other aspects, the foreign object 208 may be exposed to a biasing time-varying (alternating) magnetic field $\vec{B}_{exp}(t)$. In some aspects, the biasing time-varying magnetic field $\vec{B}_{exp}(t)$ may be a low frequency magnetic field as generated by the inductive power transfer system. In such cases, means for generating a second time-varying magnetic field may include one or more inductive power transfer coils (e.g., transmit coil, receive coil, transmit/receive coil, or any combination thereof). The alternating magnetic field $\vec{B}_{exp}(t)$ may alternate with a frequency $f_{IPT}$. As with the static magnetic field described above, the foreign object's 204 electrical conductivity $\sigma(\vec{B}_{exp})$ and magnetic permeability $\mu(\vec{B}_{exp})$ vary in some relationship to the alternating magnetic field $\vec{B}_{exp}(t)$, so as to modulate current $i_s(t)$, which is driven by the voltage $v_s(t)$ provided by the signal source 210.

The foreign object's 208 electrical conductivity $\sigma(\vec{B}_{exp})$ and magnetic permeability $\mu(\vec{B}_{exp})$ are typically also functions of the object's temperature $\vartheta$, and are thus also indirectly affected by the alternating magnetic field $\vec{B}_{exp}(t)$ via the Joule heating effect. However, this Joule heating effect is generally much weaker than the modulating effect due to exposure to the biasing alternating magnetic field, and changes due to the Joule heating effects are also orders of magnitude slower than the nearly instantaneous changes due to this modulating effect, depending on a thermal capacity of the foreign object 208 and a heating power. The presence of the foreign object 208 can potentially be detected by analyzing the current $i_s(t)$ in relation to source voltage $v_s(t)$ and to the alternating magnetic field $\vec{B}_{exp}(t)$ signal by this modulating effect and, in some cases, also by the thermal effect.

Intermittent exposure of the foreign object 208 to the alternating magnetic field $\vec{B}_{exp}(t)$ results in exposure intervals of the sense coil 204 that toggle on and off and change the sense coil's 204 inductance and resistance. In the presence of the foreign object 208, the equivalent resistance and the equivalent inductance periodically vary with a frequency (modulating frequency) that is double that of the frequency $f_{IPT}$ of the alternating magnetic field $\vec{B}_{exp}(t)$. This frequency doubling effect indicates that this modulation of electromagnetic material properties is independent of the sign of the alternating magnetic field $\vec{B}_{exp}(t)$, and thus provides a rectifying effect. In addition, a short term average of the equivalent resistance instantaneously increases when the alternating magnetic field $\vec{B}_{exp}(t)$ is toggled on. This is an opposite effect from that previously described with respect to the ordinary magneto-impedance effect, where the equivalent resistance decreases with exposure to the static magnetic field. In addition, exposure to the alternating magnetic field $\vec{B}_{exp}(t)$ may heat the foreign object 208 due to the Joule heating effect. This temperature effect may correlate with a short term average of the equivalent resistance and of the short term average of the equivalent inductance.

For a sensing system using the sinusoidal sense voltage $v_s(t)$, this modulation effect can be generally observed in the time domain as an amplitude and phase modulation of the resulting current $i_s(t)$. For some ferromagnetic objects (e.g. paper clips) this modulation effect may be highly non-linear, manifesting in a periodic sequence of short pulses, however, with a fundamental frequency that is twice that of the frequency $f_{IPT}$ of the alternating magnetic field $\vec{B}_{exp}(t)$. The degree of modulation depends on the impact of the foreign object 208 on the inductive sense coil's 204 equivalent inductance and equivalent resistance, as well as on the material and the orientation of the foreign object 208. In the frequency domain, this modulation can be observed as modulation harmonic side-bands up to several orders.

Figure 3:
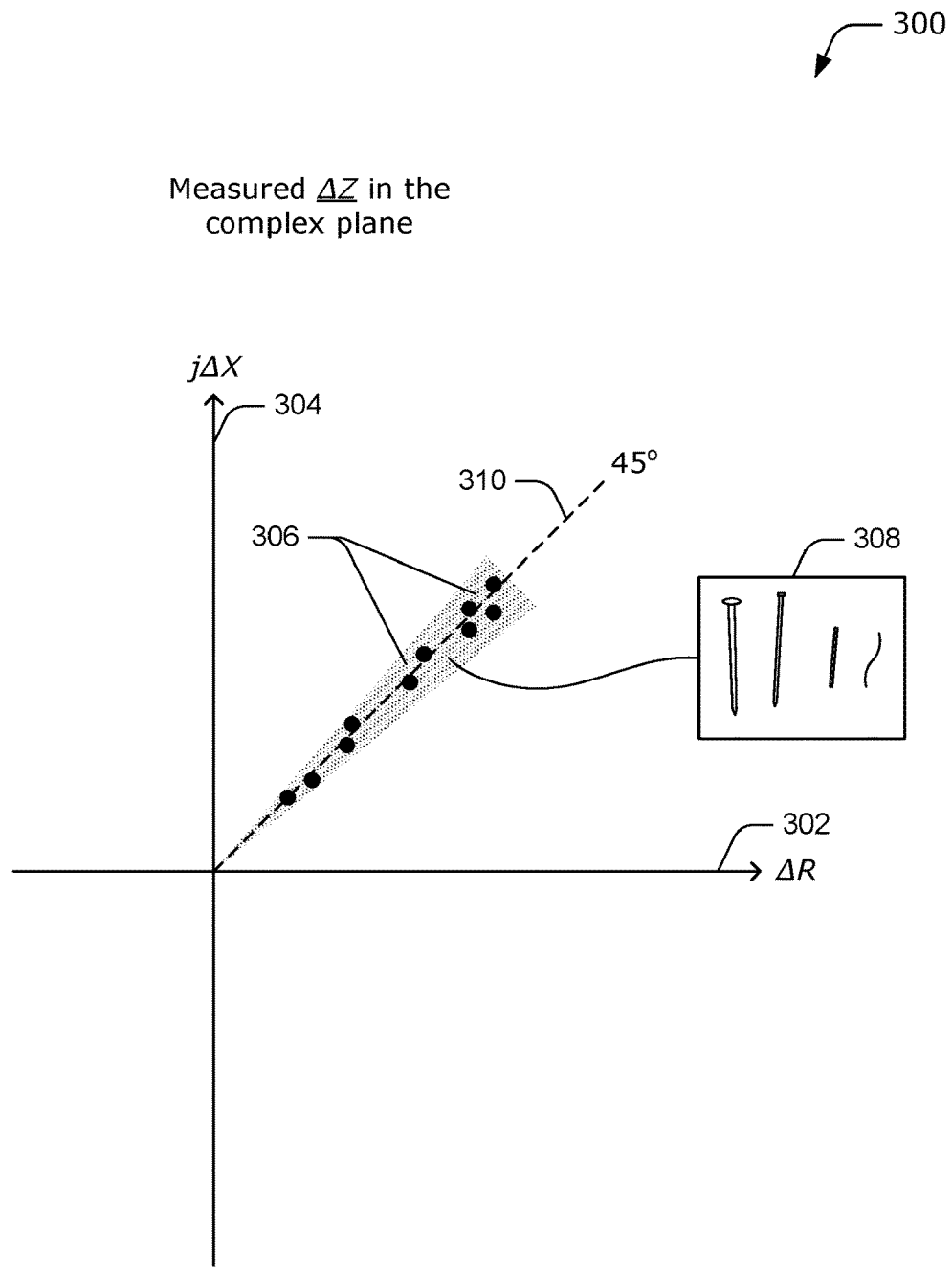
FIG. 3 illustrates an example implementation of an observed relationship between relative changes in reactance and resistance of a sense coil sensing ferromagnetic wire-like objects.

Consider now FIG. 3, which illustrates an example implementation 300 of an observed relationship between relative changes in reactance and resistance of a sense coil sensing ferromagnetic wire-like objects. In the illustrated example, data points are plotted in a complex plane that correspond to a change in the reactance $\Delta R$ along the x-axis 302 and the change in the resistance $\Delta X$ along the y-axis 304.

It has been observed that a material from which an object is made, when present in a detection volume of the sense coil, can be determined based on an impedance change angle (e.g., the relationship between the change in the imaginary component, or reactance, and a change in the real component, or resistance) of the sense coil. Specifically, the material can be determined based on an angle that a line, connecting the complex impedance of the sense coil when no object is present (e.g., reference complex impedance) with the complex impedance of the sense coil when the object is present (e.g., current complex impedance), makes with a horizontal line extending through the complex impedance of the sense coil when no object is present.

Some materials cause an increase in both the reactance and the resistance of the sense coil, which results in an impedance change toward a first quadrant (e.g., between zero and 90 degrees of an impedance change plane represented by FIG. 3). Some example objects that cause an impedance change toward the first quadrant include ferrites, ferrimagnetic materials, and living objects (e.g., human hand) However, it has also been observed that some impedance changes 306 of the sense coil that are distributed substantially along a 45-degree line 310 in the first quadrant are caused by a particular set of ferromagnetic objects, such as ferromagnetic wire-like objects 308. This is a result of the change in reactance $\Delta X$ of the sense coil 204 being substantially equal to the change in resistance $\Delta R$ of the sense coil when these wire-like objects 308 are coupled with the magnetic field.

Figure 4:
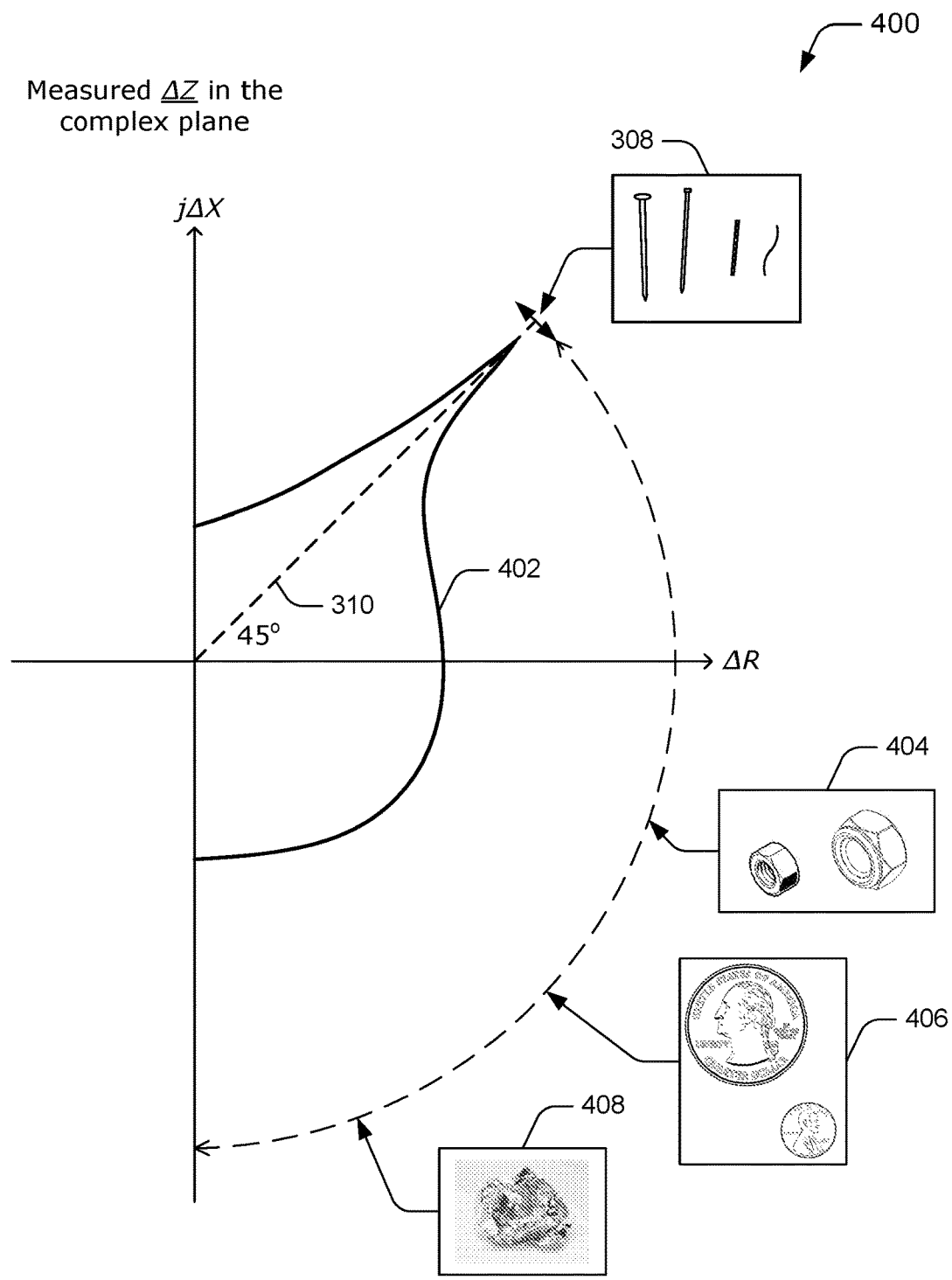
FIG. 4 illustrates an example polar sensitivity diagram representing a detection sensitivity used for detecting various different foreign ferromagnetic objects.

By comparison, consider FIG. 4, which illustrates an example implementation 400 of a polar sensitivity diagram representing a detection sensitivity 402 used for detecting various different ferromagnetic objects. In FIG. 4, various objects are illustrated as causing an impedance change at an angle between zero degrees and negative 90 degrees of the complex plane). These objects are considered objects in which eddy currents may easily be induced, causing undesirable inductive heating. Some examples of such objects include hexagonal nuts 404, coins 406, and crumpled aluminum foil 408. Because the ferromagnetic wire-like objects 308 cause impedance changes similar to that of a human hand or a non-critical ferrite object, conventional techniques generally do not detect the ferromagnetic wire-like objects 308. However, as mentioned above, these ferromagnetic wire-like objects 308 are susceptible to undesirable inductive heating, and are thus potentially hazardous.

To enhance FOD for the wire-like objects 308, the detection sensitivity 402 can be selectively increased as a ratio $\Delta X/\Delta R$ of the change in resistance $\Delta X$ over the change in reactance $\Delta R$ approaches a value of one. Accordingly, a sensitivity function or gain function can be computed by the controller 206, where the function has a highest gain if $\Delta X/\Delta R \approx 1$, and where the gain progressively decreases as the ratio deviates (e.g., higher or lower) from one. To do this, a detection threshold can be reduced by an amount that is a function of the ratio $\Delta X/\Delta R$, trading off detection probability and false alarm probability. The trade-off, however, is minimal for ferromagnetic wire-like objects 308. For such objects, the detection threshold can be lowered to increase detection sensitivity without substantially increasing a false alarm rate. Accordingly, this threshold reduction may not be performed for all objects, but selectively for this particular category of wire-like objects.

In aspects, the sense coil 204 can be implemented as at least one separate inductive sense loop of a WEVC system. For example, an inductive power transfer (IPT) system of the WEVC system can include an IPT coil that is used to magnetically bias ferromagnetic foreign objects with a static magnetic field $\vec{B}_{exp}(t)$ or an alternating magnetic field $\vec{B}_{exp}(t)$. The sense coil 204 can be implemented to detect changes in impedance of the sense coil 204 caused by ferromagnetic foreign objects that are magnetically biased by the magnetic field generated by the IPT coil. In other aspects, the sense coil 204 can be implemented as the IPT coil of the IPT system.

The type of object present can be determined based essentially on a direction that the complex impedance of the sense coil shifts from the impedance of the sense coil when no objects are present in the detection volume. The type of object may be determined by a coarse determination of the direction of change in the reactance and the direction of change in the resistance of the sense coil. Alternatively, the type of object may be determined by performing an inverse tangent operation on a quotient of the amount of change in the reactance of the sense coil divided by the amount of change in the resistance of the sense coil and then determining a type of the object based on a result of the inverse tangent operation coinciding with a predetermined range of values corresponding to the type of the object. If the angle is determined to be approximately 45 degrees, then the detection sensitivity can be increased, as described above, to detect whether a ferromagnetic wire-like object or some non-critical object is present.

Example Procedures

The following discussion describes example procedures for improving foreign object detection for ferromagnetic wire-like objects. The example procedures may be employed in the system 100 of FIG. 1, the system 900 of FIG. 9, and/or any other suitable environment. The acts described for the various procedures can be implemented automatically and independent of user interaction. The orders in which operations of these procedures are shown and/or described are not intended to be construed as a limitation, and any number or combination of the described procedure operations can be combined in any order to implement a method, or an alternate method.

Figure 5:
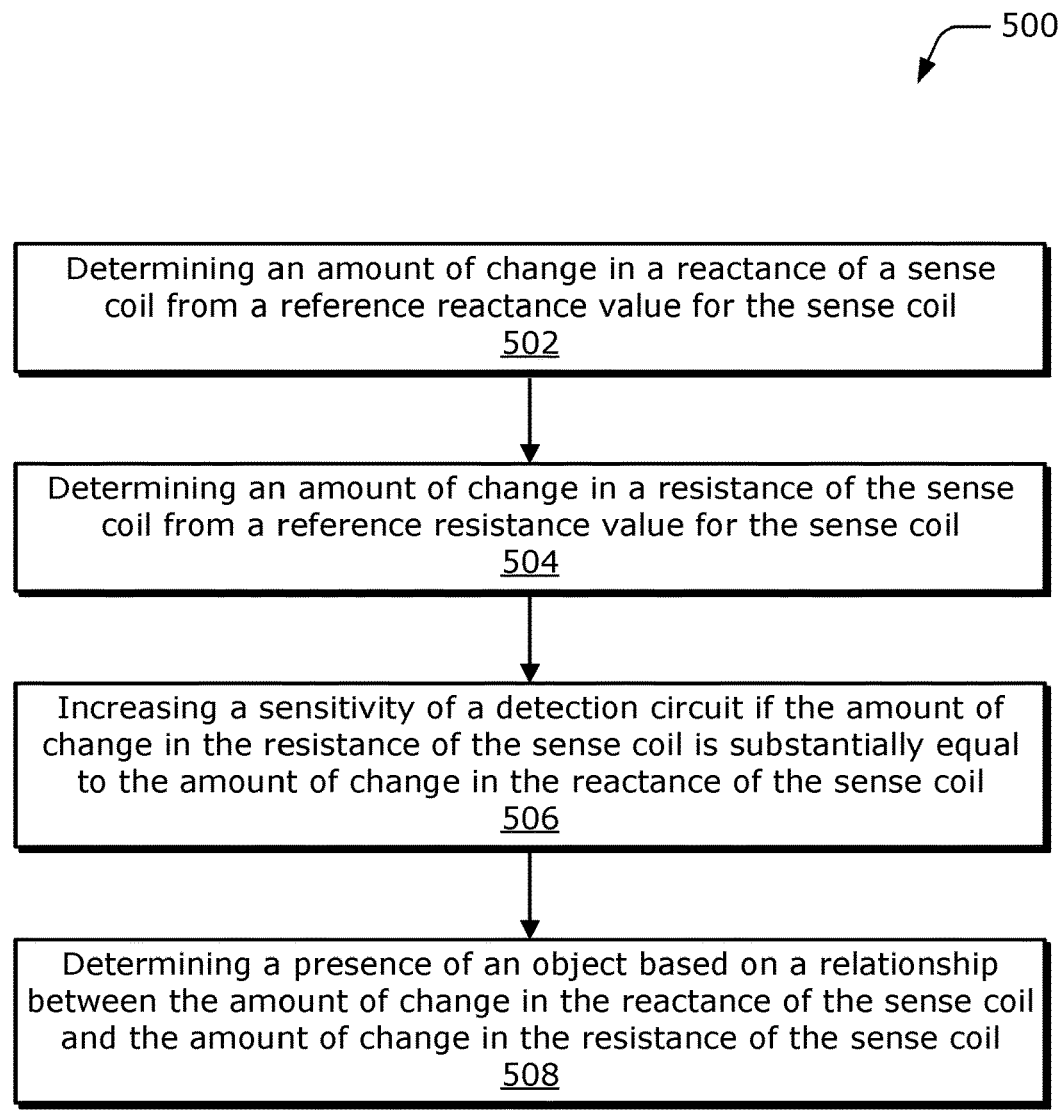
FIG. 5 depicts a flow diagram of an example process for improving foreign object detection for ferromagnetic wire-like objects, in accordance with some implementations.

FIG. 5 depicts a flow diagram of an example process 500 for improving foreign object detection for ferromagnetic wire-like objects, in accordance with some aspects. At 502, an amount of change in a reactance of a sense coil is determined from a reference reactance value for the sense coil. For example, a reference reactance value for each sense coil may be previously determined through calibration or manual setting of the reactance for that sense coil when no foreign object is present in the detection volume. A current reactance of the sense coil is determined and compared to the calibrated reactance for that sense coil. The difference between these two values is an amount of change in the reactance of the sense coil from the reference reactance value for that sense coil.

At 504, an amount of change in a resistance of a sense coil is determined from a reference resistance value for the sense coil. For example, a reference resistance value for each sense coil may be previously determined through calibration or manual setting of the resistance for that sense coil when no foreign object is present in the detection volume. A current resistance of the sense coil is determined and compared to the calibrated resistance for that sense coil. The difference between these two values is an amount of change in the resistance of the sense coil from the reference resistance value for that sense coil.

At 506, a sensitivity of a detection circuit is increased if the amount of change in the resistance of the sense coil is substantially equal to the amount of change in the reactance of the sense coil. For example, a ratio of the amount of change in the reactance and the amount of change in the resistance can be computed. Then, a detection threshold can be reduced as the ratio approaches a value of one (e.g., 0.9, 0.96, 1.0, 1.05, 1.1, etc.). This ratio also represent the impedance change angle described above, which is equal to 45 degrees when the ratio equals one. Accordingly, as the ratio approaches the value of one, the impedance change angle approaches the value of 45 degrees (e.g., 44.0°, 44.5°, 45.0°, 45.5°, 46.0°, etc.). Accordingly, the detection threshold can be adjusted based on a function of the ratio of the amount of change in the reactance and the amount of change in the resistance of the sense coil.

At 508, a presence of an object is determined based on a relationship between the amount of change in the reactance of the sense coil and the amount of change in the resistance of the sense coil. For example, the type of object can be determined based on an angle formed between a horizontal line extending through a reference complex impedance of the sense coil, and a line connecting the reference complex impedance of the sense coil and a current complex impedance of the sense coil when the object is present. If the angle is approximately 45 degrees, then a ferromagnetic wire-like object may be detected.

Example Detection Circuits

The following discussion describes example detection circuits for improving foreign object detection for ferromagnetic wire-like objects in accordance with one or more aspects. The example detection circuits may be employed in the system 100 of FIG. 1, the system 900 of FIG. 9, and/or any other suitable environment. The detection circuits, for instance, represent means for implementing the example aspects discussed above.

Figure 6:
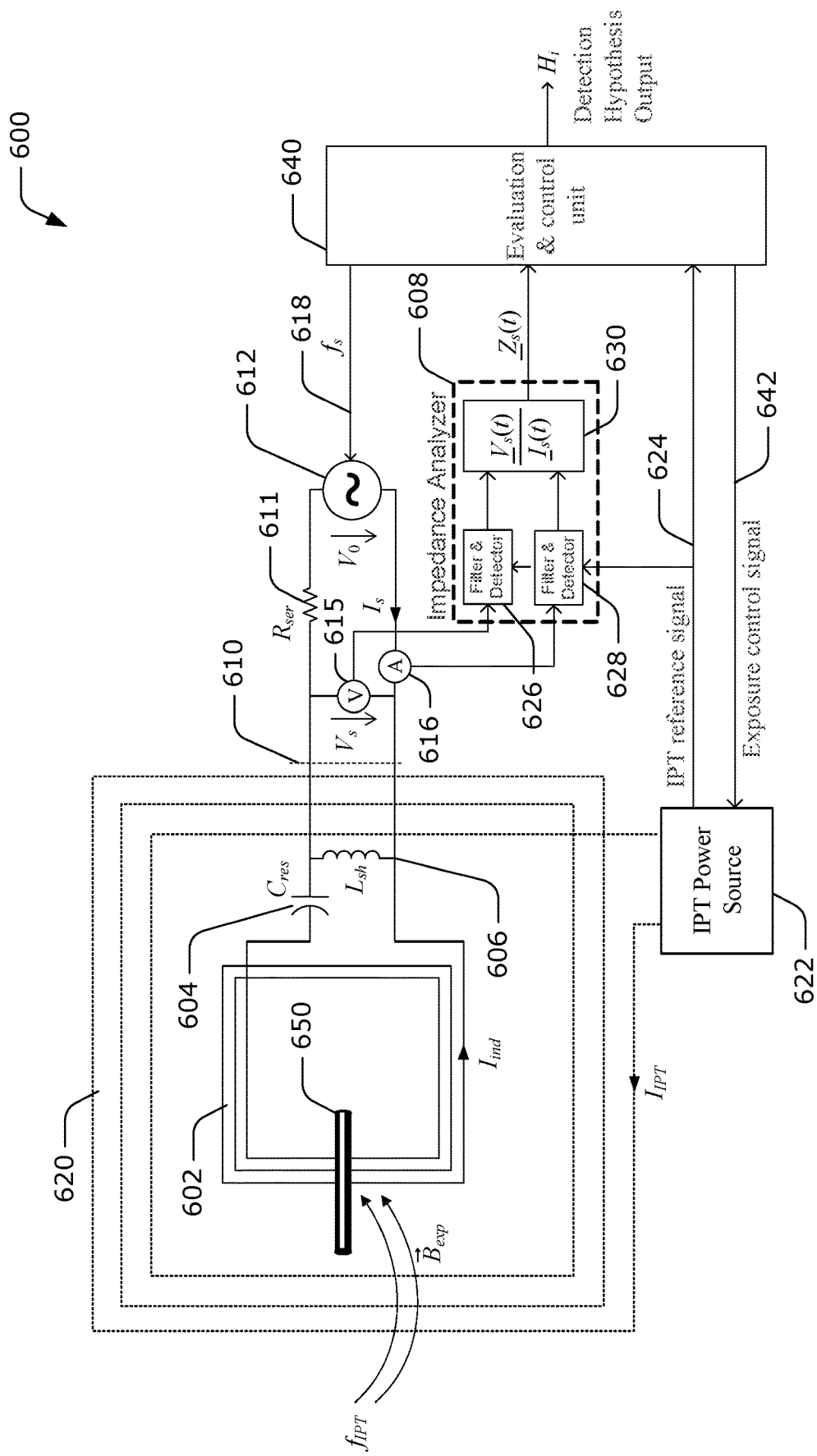
FIG. 6 is a diagram of an example ferromagnetic foreign object detection circuit based on a continuous waveform response approach, in accordance with some implementations.

FIG. 6 is a diagram of an example ferromagnetic foreign object detection circuit 600 based on a continuous waveform response approach, in accordance with some aspects. As shown in FIG. 6, an IPT coil 620 and a IPT power source 622 may be used to magnetically bias ferromagnetic foreign objects (e.g., the foreign object 650) with an alternating magnetic field $\vec{B}_{exp}(t)$. The circuit 600 includes an inductive sensing coil 602 connected in series with a capacitor $C_{res}$ 604, and a shunt inductor $L_{sh}$ 606 connected in parallel with the series combination of the capacitor 604 and the coil 602. An example of the inductive sensing coil 602 includes the sense coil 102 as described with reference to FIG. 1. The circuit 600 additionally includes a measurement port 610, indicated by a dashed line, in parallel with the shunt inductor 606. The measurement port 610 includes a voltage sensor 615 and a current sensor 616 and is further connected to a sense signal voltage source 612 via a series resistor $R_{res}$ 611. The sense signal voltage source 612 is configured to generate a sinusoidal (harmonic) sense signal and further includes an input for controlling the sense frequency $f_s$.

The circuit 600 further comprises an impedance analyzer 608 that is configured to receive, as inputs, outputs of the voltage sensor 615 and the current sensor 616. The impedance analyzer 608 is further configured to output an impedance $Z_s(t)$ determination to an evaluation & control unit 640 and to receive an IPT reference signal 624 for frequency and phase synchronization purposes from the IPT power source 622.

The evaluation & control unit 640 controls the sense frequency $f_s$ via an output 618 provided to the sense signal voltage source 612 and also controls the alternating magnetic field $\vec{B}_{exp}(t)$ via another output 642 provided to the IPT power source 622. The evaluation & control unit 640 additionally comprises an input to receive the IPT reference signal 624 from the IPT power source 622, which in addition to frequency and phase may also reflect a current level, a power level, or any other operational status of the IPT power source 622. The evaluation & control unit 640 also includes an output for providing a detection hypothesis $H_i$.

The series capacitor $C_{res}$ 604 in combination with shunt inductor $L_{sh}$ 606 serves as a high pass filter to attenuate the voltage induced in the inductive sensing coil 602 by the alternating magnetic field $\vec{B}_{exp}(t)$ at an IPT frequency $f_{IPT}$. Attenuating this low frequency component may generally relax requirements on the voltage sensor 615, the current sensor 616, and the impedance analyzer 608, and may also reduce any non-linear distortion effects such as cross-modulation between any low and high frequency signal components. The capacitor $C_{res}$ 604 may also lower a current component $I_{ind}$, at the IPT frequency $f_{IPT}$, induced in the inductive sensing coil 602, which will lower consequent Joule heating effects in the inductive sensing coil 602. Self-heating of the inductive sensing coil 602 may exert a disturbing effect (e.g., as a change in output of the inductive sensing coil 602) when sensing objects via a change of their temperature. The capacitor $C_{res}$ 604 may also serve to fully or partially compensate for the reactance of the inductive sensing coil 602 at the sense frequency $f_s$, as will be outlined in more detail below. The series resistor $R_{res}$ 611 may serve to limit the sense current $I_s$, e.g., if the circuit 600 is tuned to resonance (e.g., full compensation) to minimize an impedance at the measurement port 610.

In some aspects, the shunt inductor $L_{sh}$ 606 may be omitted or reduced in physical size (e.g., for a lower current rating). In such aspects, the circuit 600 may actively cancel or minimize the IPT frequency $f_{IPT}$ voltage component at the measurement port 610 by using a signal voltage source (e.g., sense signal voltage source 612) that generates a high frequency sense signal superimposed over a low frequency compensation signal (e.g., at the IPT frequency $f_{IPT}$). The circuit 600 may then adjust an amplitude and/or a phase of the low frequency compensation signal so as to minimize the IPT frequency voltage at the measurement port 610.

In some other aspects, the shunt inductor $L_{sh}$ 606 may be an "air coil" not including any ferrite core. This may be required to avoid any modulation effect that may be produced by a ferrite core in the presence of the current component $I_{ind}$. Since shunt inductor $L_{sh}$ 606 is connected in parallel at the measurement port 610, even very weak modulation effects may seriously desensitize detection of the foreign object 650.

Selecting a suitable sense frequency requires particular attention. The fundamental frequency, the harmonic frequencies, and other switching noise of the IPT system may potentially interfere or cross-modulate with the sense signal thus desensitizing foreign object detection. With respect to the circuit 600 of FIG. 6, and considering the values of the capacitor $C_{res}$ 604, the inductor $L_{sh}$ 606, and other design constraints, substantial attenuation of the fundamental frequency and noise may be achieved at frequencies well above 150 kHz, preferably in the MHz range. Another aspect for consideration is sensitivity to capacitive effects and thus to non-metallic dielectric objects (e.g. water, snow, ice, etc.). Capacitive effects may be explained by a parasitic electric field that is also generated by the inductive sense coil at high frequency. Sensitivity of electric fields may become an issue at frequencies above 10 MHz. In view of these factors, a sense frequency well above $f_{IPT}$, e.g., in the frequency range 1 to 10 MHz, may be a good trade off.

A quantity representative of the inductive sense coil's equivalent inductance and equivalent resistance may be the complex impedance $\underline{Z}_s$ that is a function of time (e.g., is modulated) when the foreign object 650 is present. This notion of an impedance may be applied if the sense signal is a continuous sinusoidal wave and if the sense frequency $f_s$ is significantly higher than the modulation frequency (e.g., $f_{IPT}$), which may hold for sense frequencies $f_s$ in the MHz range. For other excitations, the notion of an impedance may not be appropriate.

In some aspects, the time varying complex impedance $\underline{Z}_s(t)$ may be obtained by sensing the voltage $V_s$ and the current $I_s$ at the measurement port 610. In more detail, the complex impedance $\underline{Z}_s(t)$ is obtained by filtering and envelope detection of the sensed voltage $V_s$ and the sensed current $I_s$ in the filter & detector module 626 and the filter & detector module 628, respectively, to obtain the complex voltage envelope $\underline{V}_s(t)$ and the complex current envelope $\underline{I}_s(t)$ (e.g., the modulation waveforms). The filter & detector module 626 may then output the complex voltage envelope $\underline{V}_s(t)$ and the filter & detector module 628 may then output the complex current envelope $\underline{I}_s(t)$ to the module 630 that computes the quotient $\underline{Z}_s(t)=\underline{V}_s(t)/\underline{I}_s(t)$. The filters within the modules 626 and 628 may be matched filters that reduce noise with minimal distortion of the voltage $\underline{V}_s(t)$ and current $\underline{I}_s(t)$ modulation waveforms. In addition, the filter & detector modules 626 and 628 may be frequency and/or phase synchronized to the alternating magnetic field $\vec{B}_{exp}(t)$ by receiving the IPT reference signal 624 from the IPT power source 622.

In some aspects, the complex impedance $\underline{Z}_s(t)$ may be measured with a frequency $f_s$ substantially at resonance, as essentially defined by the inductive sense coil's inductance $L_{sc}$ (not shown in FIG. 6) and the capacitance $C_{res}$ 604. However, measuring the impedance $\underline{Z}_s(t)$ at resonance should not be construed as a general necessity for a foreign object detection method. However, resonance may be advantageous to reduce dynamic range requirements for the voltage sensor 615, the current sensor 616, and the impedance analyzer 608. While an absolute impedance change (e.g., $2\pi f_s \Delta L_{sc}$) due to the presence of the foreign object 650 is independent of any reactance compensation, the relative (e.g., percentage) change becomes more significant if the gross voltage across the inductive sensing coil 602 is compensated for by tuning the sense frequency $f_s$ to resonance since it is the relative impedance change that determines the dynamic range requirements of the voltage sensor 615, the current sensor 616 and the components within the impedance analyzer 608. Further benefits of resonance tuning are discussed below.

The evaluation & control unit 640 may further process and compare the detected complex impedance waveforms $\underline{Z}_s(t)$ against a reference waveform, also taking into account information received via the IPT reference signal 624, to finally select a detection hypothesis $H_i$. Such reference waveforms may be obtained in a system calibration process.

In some aspects, the evaluation & control unit 640 may be configured to determine the presence of the foreign object 650 based on detecting a predetermined level or amount of modulation and on other distinct characteristics in the detected complex impedance waveforms $\underline{Z}_s(t)$. These characteristics (e.g., the modulation harmonics) may be analyzed in the time domain or in the frequency domain (e.g. by a Fourier series).

In some other aspects, the evaluation & control unit 640 may also correlate the determined complex impedance waveform $\underline{Z}_s(t)$ with the duty cycles of the intermittent alternating magnetic field $\vec{B}_{exp}(t)$ to determine the presence of the foreign object 650 via the alternating magnetic field biasing and/or via the heating effect.

Figure 7:
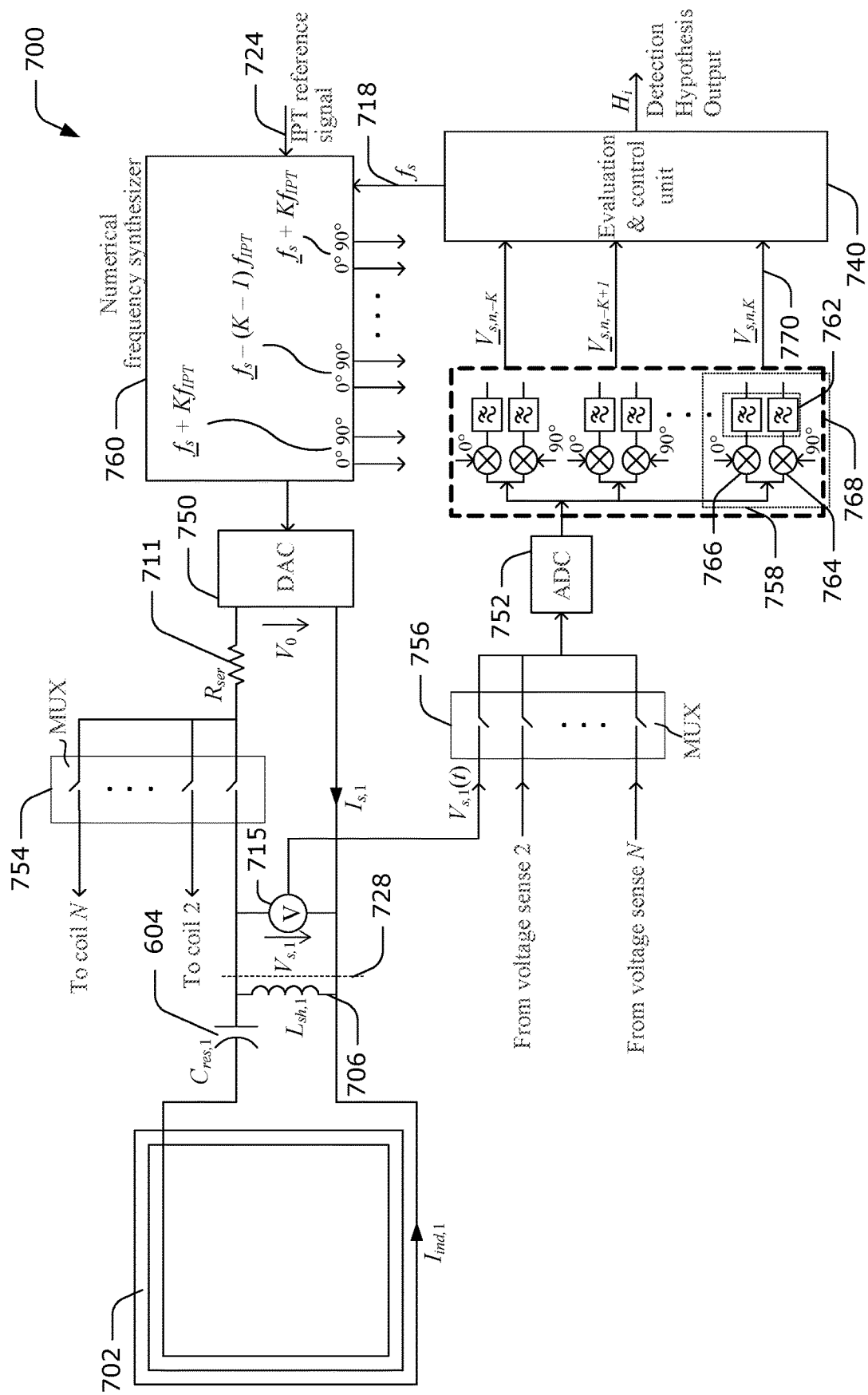
FIG. 7 is a diagram of another example ferromagnetic foreign object detection circuit based on a continuous waveform response approach, in accordance with some implementations.

FIG. 7 is a diagram of another example ferromagnetic foreign object detection circuit 700 based on a continuous waveform response approach, in accordance with some aspects. The circuit 700 may determine the presence of a ferromagnetic object (not shown) based on a frequency domain processing approach. The circuit 700 utilizes a plurality (N) of inductive sensing coils (e.g., a coil array, not completely shown in FIG. 7) including an inductive sensing coil 702, in order to provide sufficient detection sensitivity over an entire surface area of an IPT coupler (e.g. a base pad, not shown in FIG. 7). An example of the inductive sensing coil 702 includes the sense coil 102 as described with reference to FIG. 1. For the sake of clarity, FIG. 7 omits portions of the IPT system (as shown in FIG. 6) that may be used for the foreign object detection process. The circuit 700 is substantially the same as that shown in FIG. 6 except that it includes multiplexers 754 and 756 (e.g., comprising N analog switches) and omits the current sensor 716. In some aspects, means for multiplexing measurements of a plurality of changes in the electrical characteristic of a plurality of inductive sensing coils may comprise at least one of the multiplexers 754 and 756.

In this detection circuit 700 the sense signal voltage source (612 as shown in FIG. 6) is accomplished by a numerical frequency synthesizer 760 that feeds into a Digital-to-Analog Converter (DAC) 750. The DAC 750 provides a voltage source output $V_o$ connected to a measurement port 728 (denoted by the dotted line) via a series resistor $R_{ser}$ 711 and the multiplexer 754. The DAC 750 may include analog signal restoration filters (not shown in detail in FIG. 7) as needed to generate a clean sense voltage signal. The resistor $R_{ser}$ 711 may also include the on-state resistance of the respective switch within the multiplexer 754. FIG. 7 shows the resistor $R_{ser}$ 711 in common with a plurality of N inductive sensing coils (not shown). However, in some aspects the multiplexer 754 can be directly connected to the sense signal source (e.g., the DAC 750), and N resistors used downstream (e.g., to the left, at the outputs) of the multiplexer 754. This configuration may have less issues with parasitic parallel capacitances from analog switches at the measurement port 728.

The DAC 750 output voltage $V_o$ and the resistor $R_{ser}$ 711 may be selected to act substantially as a constant alternating current (AC) source driving a quasi-constant sinusoidal current $I_{s,1}$ into the inductive sensing coil that is selected by the multiplexer 754. Alternatively, the DAC 750 may provide a constant AC source output not requiring the series resistance $R_{ser}$ 711. Assuming a defined, constant sense current $I_{s,1}$, the sensed voltage $V_{s,i}$ at the measurement port 728 of the i-th sense circuit (other circuits not shown) may be considered to directly reflect the impedance $\underline{Z}_{s,i}$.

Furthermore, FIG. 7 shows each of the N voltage sensor outputs connected to an Analog-to-Digital Converter (ADC) 752 via a second multiplexer 756 (e.g., comprising N analog switches). The voltage sensor 715 and/or the ADC 752 may include analog signal preconditioning circuitry such as preamplifying and/or anti-aliasing filters that are not shown in detail in FIG. 7. Narrowband filtering and detection of the complex voltage waveform may then be performed in the digital (numerical) domain. The voltage waveform $V_{s,i}(t)$, which is input to the ADC 752 via the multiplexer 756, is analyzed in the Fourier (e.g., frequency) domain using a bank of 2K+1 synchronous detectors 768, one for each modulation side band frequency. A suitable value for K may be any of 2, 3, 4, although the present application is not so limited such that K may have any integer value.

Each synchronous detector 768 (e.g., within the bank 758) provides an in phase mixer 766, a quadrature mixer 764, a low pass filter 762 and a complex (in-phase and quadrature) output 770 delivering a complex amplitude (e.g., representing a Fourier coefficient) denoted by $\underline{V}_{s,n,k}$, where n refers to the n-th sense coil and k to the k-th order modulation harmonic, where $|k| \leq 2K$. The zero-order modulation harmonic $\underline{V}_{s,n,0}$ refers to the sense carrier signal component and is obtained by mixing $V_{s,i}(t)$ with a sinusoidal quadrature waveform with frequency $f_s$. The low pass filter 762 may be a Finite Impulse Response (FIR)-type filter dimensioned with respect to filtering requirements and detection time constraints. In a foreign object detection system using N inductive sensing coils and time multiplexing, available detection time for each sense coil reduces to $1/N^{th}$ that of an available detection time for the circuit 600 of FIG. 6.

The numerical frequency waveforms (0°, 90°) input to the in-phase and quadrature mixers, respectively, are generated by a numerical frequency synthesizer 760 with frequencies. In some aspects, all frequency waveforms may be based on the sense frequency $f_s$ 718 received from the evaluation & control unit 740 and on the external IPT reference signal 724 received from IPT transfer system. In some aspects, the IPT reference signal 724 is derived from the residual IPT frequency voltage as it may be sensed at the measurement port 728 of the i-th sense circuit. The numerical frequency synthesizer 760 may include means for frequency and phase synchronizing an internal numerical oscillator to the external IPT reference signal 724.

The evaluation & control unit 740 may determine the presence of a potential object by comparing a detected set of complex outputs ($V_{s,n,K}$) against a set of reference values using an appropriate threshold. The reference values may be obtained in a process of system calibration. Moreover, the evaluation & control unit 740 may correlate time sequences of consecutively detected sets of outputs with the alternating magnetic field intervals, e.g., for detecting objects via the magnetic field biasing and/or heating effect. The zero-order coefficient $\underline{V}_{s,n,0}$ may be of particular relevance in such a correlation approach.

In some aspects, the real and imaginary components of the complex voltage $\underline{V}_{s,n,0}$ should reflect an inductive sensing coil's 702 equivalent resistance and equivalent inductance, respectively, requiring true mapping of the complex voltage. True voltage (e.g., impedance) mapping may provide most of the information for discriminating between potential objects and other disturbances. However, true voltage mapping may require the system to compensate for any phase error that is introduced by the analog circuitry between the DAC 750 and the ADC 752. This phase error may generally vary with frequency, with the selected inductive sensing coil 702, and also with the temperature and age of components within the circuit 700.

Therefore, in some aspects the evaluation & control unit 740 performs phase correction by the following procedure. First, the sense frequency $f_s$ 718 is tuned to minimize the magnitude of $\underline{V}_{s,n,0}$. At this frequency the impedance at the measurement port 728 should, ideally, be purely resistive (zero phase), neglecting the effect of the shunt inductor $L_{sh}$ 706, which allows the circuit 700 to determine phase error. Knowing the phase error, the circuit 700 may perform phase zeroing by rotating the voltage phasor $\underline{V}_{s,n,0}$ by an amount of measured phase error to cancel the measured phase error. This procedure may provide a sufficiently accurate phase calibration as needed for true voltage (e.g., impedance) mapping.

In some aspects, phase correction may also be required for the IPT frequency component (e.g., to be substantially in phase synchronicity with the voltage induced into the inductive sensing coil 702 at the IPT frequency $f_{IPT}$). Such correction may be performed by the numerical frequency synthesizer 760 individually for each of the inductive sensing coils 702.

Ferrites used in the IPT coupler (not shown), in the shunt inductor $L_{sh}$ 706, and other inherent non-linearity within the circuit 700 may produce a certain degree of impedance modulation. Such intrinsic modulation effects may be nullified in a calibration process.

Switching noise harmonic content produced by the IPT power source may be coupled into the inductive sensing coil 702 via the IPT coupler coil (not shown) and may fall on frequencies where foreign object detection is sensitive (e.g., the sense carrier frequency $f_s$ and modulation side-bands). Therefore, the circuit 700 may perform active interference avoidance by intelligently controlling the sense frequency $f_s$ in a manner effective to cause the IPT harmonics to remain outside of any of the sensitive frequency ranges, as defined by the bandwidth of each of the synchronous detectors 768, while remaining substantially at resonance. Conversely, the system may adjust the IPT frequency $f_{IPT}$ by a small amount.

Potential interference of an IPT frequency harmonic with any of the relevant modulation side-band harmonics can be identified by a passive detection performed by the bank of synchronous detectors 768 and the evaluation & control unit 740 when the high frequency sense signal (e.g., $V_o$ driving $I_{s,1}$ at the DAC 750) is switched off. Any potential interference may be detected as an increased signal level at any of the detector 768 outputs. When interference is detected, the evaluation & control unit 740 may slightly adjust the sense frequency $f_s$ 718, slightly shifting the frequency of the numerical frequency synthesizer 760 until the interference disappears or drops below an acceptable threshold.

The IPT power source (not shown) may also generate broadband noise that cannot be mitigated by shifting the sense frequency $f_s$. To some degree, the IPT power source may also modulate an impedance appearing at the measurement port 728. This may be explained by variations of the output impedance of the IPT power source (e.g., 622 with reference to FIG. 6) and some coupling between the inductive sensing coil 702 and the IPT coupler coil (e.g., 620 with reference to FIG. 6). These output impedance variations may also exhibit a spectrum with a fundamental frequency that is twice the IPT frequency $f_{IPT}$.

Therefore, the circuit 700 may implement a means to stabilize the output impedance and to reduce broadband noise in the sense frequency range. Such means may include high frequency filters (isolators) inserted between a power converter and the IPT coupler of the IPT system. These means may be considered an integral part of an IPT tuning and matching network. The means may further include measures in the IPT control system, and particularly in the generators of the pulse width modulated (PWM) drive waveforms, for smooth (transient-free) control and to minimize jitter. The above methods for reducing noise and impedance modulation may also apply to the IPT power sink (e.g., the IPT receiver, not shown), which may similarly disturb an inductive foreign object detection process.

The basic concept of detecting ferromagnetic metallic objects via alternating magnetic field biasing and by eddy current heating may also principally apply to an impulse response (pulse induction) detection technique, since the presence of a ferromagnetic object may also modify the impulse response of an inductive sensing coil, which may be a function of a strength of a biasing magnetic field and of the object's temperature. Such an impulse response detection technique may not need resonance tuning.

Figure 8:
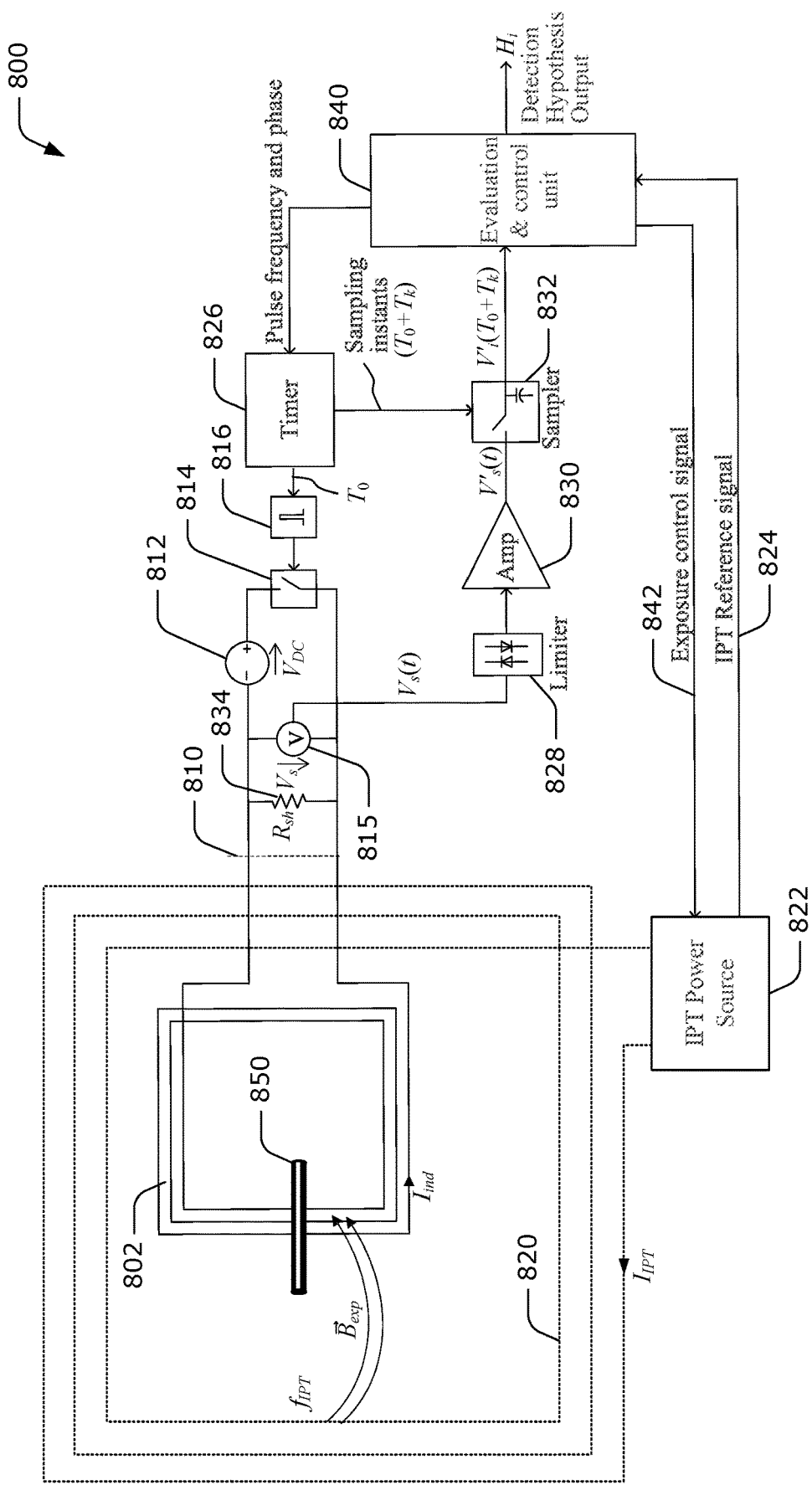
FIG. 8 is a diagram of yet another example ferromagnetic foreign object detection circuit 800 based on an impulse response approach, in accordance with some implementations.

FIG. 8 is a diagram of yet another example ferromagnetic foreign object detection circuit 800 based on an impulse response approach, in accordance with some aspects. In operation, an inductive sensing coil 802 is current-charged across a DC voltage source 812 for a short period of time. An example of the inductive sensing coil 802 includes the sense coil 102 as described with reference to FIG. 1. At a time $T_0$, the inductive sensing coil 802 is disconnected from the DC voltage source 812 and discharged across a shunt resistor 834, ideally without ringing. Finally, the voltage $V_s$, as measured across the inductive sensing coil 802, is sampled at least at one defined time instant $T_0+T_k$ and compared to at least one reference value.

FIG. 8 additionally shows relevant portions of the IPT system. The circuit 800 is characterized by a timer circuit 826 controlling a pulse generator 816, which defines the current charge time $T_o$, a switch 814 controlled by the pulse generator 816 for executing the charging pulse, the DC voltage source $V_{DC}$ 812 for charging the inductive sensing coil 802 during the sense pulse, a voltage sensor 815 for sensing a voltage $V_{s(t)}$ at the measurement port 810 during the discharging period, and a shunt resistor $R_{sh}$ 834 dimensioned for a fast discharge across the inductive sensing coil 802. A limiter 828 may receive the output of the voltage sensor 815 for limiting (e.g., clipping) the level of the measurement signal to a range of interest while also preventing saturation of an amplifier 830 that receives the output of the limiter 828. An output of the amplifier 830 is input to a sampler 832 configured to sample the voltage impulse response $V'_s(t)$ at a number K of time instants $T_0+T_k$, k=1 ... K as controlled by the timer circuit 826. An evaluation & control unit 840 evaluates consecutively detected voltage samples $V'_s(T_0+T_k)$ and determines a presence of a ferromagnetic object (e.g., the foreign object 850) by comparing the voltage samples against a set of reference values.

In an example, the foreign object 850 is detected by periodically applying a voltage pulse to the inductive sensing coil 802. Pulsing may be performed in synchronicity with the IPT frequency $f_{IPT}$ with a pulse rate equal to, or an integer multiple of, the IPT frequency $f_{IPT}$ and having a pulse phase adjusted to a suitable time instant with respect to an IPT reference signal 824, supplied to the evaluation & control unit 840 by the IPT power source 822, and with respect to switching transients that may be present in a real IPT system. This pulsing may be driven by exposure control signal 842 output from the evaluation & control unit 840. The evaluation & control unit 840 may be configured to determine a presence of the foreign object 850 based on consecutively sampled impulse responses by analyzing a degree of modulation (e.g., change), a degree of correlation with the alternating magnetic field exposure intervals, and other characteristics as sensed in the acquired time series.

Moreover, expansion of the impulse response approach to a plurality (array) of inductive sensing coils may not require a multiplexer in the sense pulse generating portion of the circuit 800, since a respective pulse switch 814 may individually provide a respective pulse to only one sense coil at a time. The DC voltage source 812 may be common to a number of sense circuits, while the shunt resistor $R_{sh}$ 834, the voltage sensor 815, and the limiter 828 may be individual for each inductive sensing coil (e.g., coil 802). Multiplexing of the sensed voltages may be performed downstream (e.g., after) the limiter 828 or even downstream (e.g., after) the amplifier 830.

The following may apply to any ferromagnetic foreign object detection circuit as disclosed herein but is described in the context of the foreign object detection circuit as shown in FIG. 8. Foreign object detection by intermittently exposing foreign objects 850 to a biasing (modulating) and/or heating alternating magnetic field $\vec{B}_{exp}(t)$ may be applied initially before starting inductive power transfer. If the circuit 800 determines the presence of the foreign object 850, the circuit 800 does not start inductive power transfer. If no object has been detected initially, during regular power transfer, the circuit 800 may employ at least one foreign object detection process, for example, a process that is suitable for detecting an object that enters the functional space when the system is active (e.g. based on a time differential approach). This may be one of an inductive sensing method that may also partially rely on alternating magnetic field biasing, a radar-based process, and/or any other sensing process. In the event that foreign object detection is signaled, the circuit 800 may verify such a detection by first ceasing inductive power transfer and then reapplying the process using alternating magnetic field biasing and/or heating. This may particularly apply for cases of low confidence detection. If the previous detection is confirmed, the circuit 800 may discontinue inductive power transfer. If the previous detection is not confirmed, the circuit 800 may reactivate inductive power transfer.

Depending on the system capabilities, the biasing and heating alternating magnetic field $\vec{B}_{exp}(t)$ may be generated by transferring real power to a load, e.g., to a battery of an electric vehicle. Alternatively, the magnetic field $\vec{B}_{exp}(t)$ may be generated by disconnecting the vehicle-side load and by generating substantially reactive power in the base IPT coupler 820 and/or in the vehicle IPT coupler (not shown).

The aspects disclosed herein may be applied more cautiously to prevent hazardous situations from occurring during the alternating magnetic field $\vec{B}_{exp}(t)$ exposure intervals. For example, the alternating magnetic field exposure $\vec{B}_{exp}(t)$ may start at a subcritical level. If no foreign object 850 is detected, the circuit 800 may successively increase (e.g., ramp up) the level of magnetic field $\vec{B}_{exp}(t)$ exposure from interval to interval.

Some objects, e.g., paper clips, may change their modulation response considerably with the level of the biasing alternating magnetic field $\vec{B}_{exp}(t)$. These effects, attributable to saturation, may reveal further information useful for determining a presence of the foreign object 850. Changes in a modulation response may also be observed when changing the frequency of the biasing alternating magnetic field $\vec{B}_{exp}(t)$. Using different levels for the biasing alternating magnetic field $\vec{B}_{exp}(t)$ may also help to discriminate between modulating effects as produced in the environment of an inductive sensing coil (802) e.g. by ferrite in the IPT coupler (not shown) and modulating effects as produced by ferromagnetic foreign objects, since these modulating effects may change differently when the level is altered. Therefore, in some aspects, foreign object detection is performed with at least one of a different level and a different frequency of the biasing alternating magnetic field $\vec{B}_{exp}(t)$.

The methods disclosed herein may be combined with at least one of a time differential approach (e.g., as previously discussed in connection with FIG. 6) and a space differential approach (e.g., as previously discussed in connection with FIG. 7). In a time-differential approach, the foreign object detection system may not apply absolute decision criteria but rather may base decisions on differences between subsequent detector outputs in time sequences of detector outputs. By contrast, in a space-differential approach, the foreign object detection system may determine a presence of a ferromagnetic object based on differences between detector outputs from neighboring inductive sensing coils.

Metallic structures in the environment of an inductive sense coil (e.g. the vehicle pad and vehicle underbody) may temporarily move. This may occur, for example, when a person enters or leaves the vehicle or when the vehicle is loaded or unloaded. These movements may seriously disturb inductive sensing based on the above-described processes. Such disturbances are expected to occur substantially simultaneously for a majority of inductive sensing coils of a foreign object detection array. Therefore, such a system may discontinue inductive sensing based on alternating magnetic field biasing and/or heating in the event that significant changes of an inductive sense coil's characteristic occur coincidentally on a majority of inductive sensing coils.

Example Wireless Power Transfer System

Figure 9:
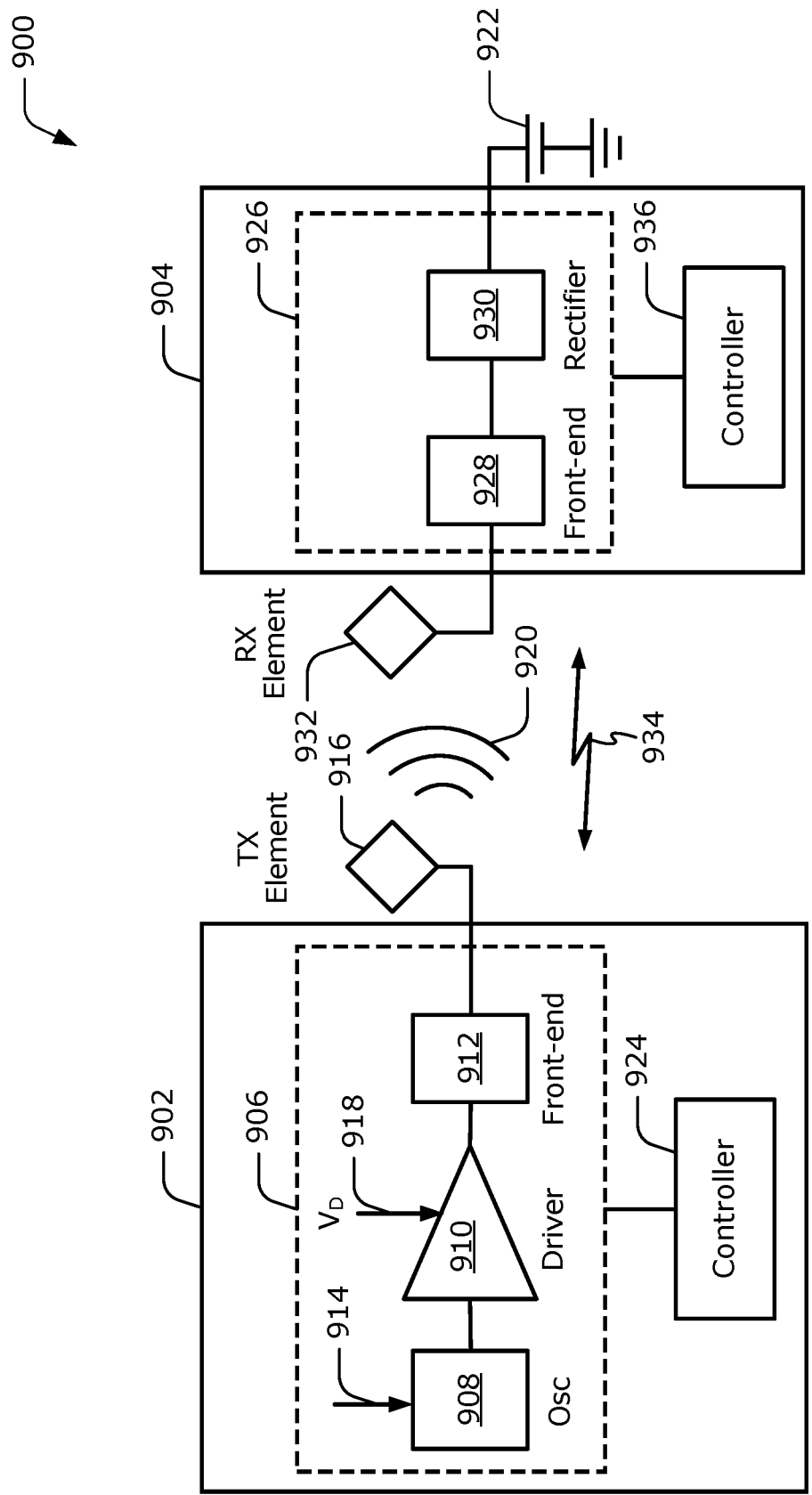
FIG. 9 illustrates an example wireless power transfer system having components through which aspects of foreign object detection for ferromagnetic wire-like objects can be implemented.

FIG. 9 illustrates an example wireless power transfer system 900, which includes components capable of implementing aspects of improved foreign object detection for ferromagnetic wire-like objects. The system 900 includes a transmitter 902 and a receiver 904. The transmitter 902 may include transmit circuitry 906 having an oscillator 908, a driver circuit 910, and a front-end circuit 912. The oscillator 908 may be configured to generate an oscillator signal at a desired frequency that may adjust in response to a frequency control signal 914. The oscillator 908 may provide the oscillator signal to the driver circuit 910. The driver circuit 910 may be configured to drive the power transmitting element 916 at, for example, a resonant frequency of the power transmitting element 916 based on an input voltage signal ($V_D$) 918. The driver circuit 910 may be a switching amplifier configured to receive a square wave from the oscillator 908 and output a sine wave.

The front-end circuit 912 may include a filter circuit configured to filter out harmonics or other unwanted frequencies. The front-end circuit 912 may include a matching circuit configured to match the impedance of the transmitter 902 to the impedance of the power transmitting element 916. The front-end circuit 912 may include also a tuning circuit to create a resonant circuit with the power transmitting element 916. As a result of driving the power transmitting element 916, the power transmitting element 916 may generate a wireless field 920 to wirelessly output power at a level sufficient for charging a battery 922, or otherwise powering a load.

The transmitter 902 may further include a controller 924 operably coupled to the transmit circuitry 906 and configured to control one or more aspects of the transmit circuitry 906, or accomplish other operations relevant to managing the improved foreign object detection for ferromagnetic wire-like objects. The controller 924 may be a microcontroller or a processor. The controller 924 may be implemented as an application-specific integrated circuit (ASIC). The controller 924 may be operably connected, directly or indirectly, to each component of the transmit circuitry 906. The controller 924 may be further configured to receive information from each of the components of the transmit circuitry 906 and perform calculations based on the received information. The controller 924 may be configured to generate control signals (e.g., the control signal 914) for each of the components that may adjust the operation of that component. As such, the controller 924 may be configured to adjust or manage the inductive power transfer based on a result of the operations it performs. The transmitter 902 may further include a memory (not shown) configured to store data, for example, such as instructions for causing the controller 924 to perform particular functions, such as those related to management of wireless power transfer.

The receiver 904 may include receive circuitry 926 having a front-end circuit 928 and a rectifier circuit 930. The front-end circuit 928 may include matching circuitry configured to match the impedance of the receive circuitry 926 to the impedance of the power receiving element 932. The front-end circuit 928 may further include a tuning circuit to create a resonant circuit with the power receiving element 932. The rectifier circuit 930 may generate a DC power output from an AC power input to charge the battery 922, or provide power to some other load. The receiver 904 and the transmitter 902 may additionally communicate on a separate communication channel 934, e.g., Bluetooth™, ZigBee™, and cellular. The receiver 904 and the transmitter 902 may alternatively communicate via in-band signaling using characteristics of the wireless field 920.

Further, the receiver 904 may be configured to determine whether an amount of power transmitted by the transmitter 902 and received by the receiver 904 is appropriate for charging the battery 922 or powering a load. In certain embodiments, the transmitter 902 may be configured to generate a predominantly non-radiative field with a direct field coupling coefficient (k) for providing energy transfer. The receiver 904 may directly couple to the wireless field 920 and may generate an output power for storing or consumption by the battery 922 (or load), coupled to the output of the receive circuitry 926.

The receiver 904 may further include a controller 936 configured similarly to the transmit controller 924 as described above for one or more wireless power management aspects of the receiver 904. The receiver 904 may further include a memory (not shown) configured to store data, such as instructions for causing the controller 936 to perform particular functions, such as those related to foreign object detection for ferromagnetic wire-like objects. The transmitter 902 and receiver 904 may be separated by a distance and configured according to a mutual resonant relationship to minimize transmission losses between the transmitter 902 and the receiver 904.

The power transmitting element 916 and the power receiving element 932 may correspond to or be included as part of, respectively, the base wireless charging system 102a, 102b, the base system coupler 104a, 104b, and/or the electric vehicle coupler 116 that utilize techniques for improved foreign object detection for ferromagnetic wire-like objects described herein.

The various illustrative logical blocks, modules, circuits, and method steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the described aspects.

The various illustrative blocks, modules, and circuits described in connection with the aspects disclosed herein may be implemented or performed with a general purpose hardware processor, a Digital Signal Processor (DSP), an Application-Specific Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the aspects disclosed herein may be embodied directly in hardware, in a software module executed by a hardware processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray™ disc where disks usually reproduce data magnetically, while discs reproduce data optically with lasers. Combinations of the above should also be included within the scope of computer-readable media. The hardware processor and the storage medium may reside in an ASIC.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus for detecting an object, comprising:
a sense coil; and
a detection circuit configured to:
determine an amount of change in a reactance of the sense coil from a reference reactance value for the sense coil;
determine an amount of change in a resistance of the sense coil from a reference resistance value for the sense coil; and
selectively increase a sensitivity of the detection circuit as a ratio of the amount of change in the resistance and the amount of change in the reactance of the sense coil approaches a value of one, the sensitivity increased by reducing a detection threshold by an amount that is a function of the ratio.

2. The apparatus as described in claim 1, wherein the detection circuit is configured to determine a presence of the object based on a relationship between the amount of change in the reactance of the sense coil and the amount of change in the resistance of the sense coil.

3. The apparatus as described in claim 1, wherein the object is a conductive ferromagnetic object.

4. The apparatus as described in claim 1, wherein the sense coil and the detection circuit are implemented in a wireless electric vehicle charging system.

5. The apparatus as described in claim 1, wherein the sense coil is implemented as an inductive power transfer coil of an inductive power transfer system.

6. The apparatus as described in claim 1, wherein:
the reference reactance value for the sense coil includes a reactance of the sense coil when no object is present; and
the reference resistance value for the sense coil comprises a resistance of the sense coil when no object is present.

7. The apparatus as described in claim 1, wherein the detection threshold is reduced as the ratio approaches the value of one from approximately 0.9 or from approximately 1.1.

8. The apparatus as described in claim 1, wherein the detection circuit is further configured to determine an impedance change angle of the sense coil based on the amount of change in the resistance of the sense coil and the amount of change in the reactance of the sense coil, wherein the detection threshold is reduced as the impedance change angle approaches a value of 45 degrees from approximately 44 degrees or from approximately 46 degrees in a complex plane.

9. The apparatus as described in claim 1, wherein the amount of change in the resistance of the sense coil is determined to be within five percent of the amount of change in the reactance of the sense coil.

10. The apparatus as described in claim 1, wherein the detection circuit is further configured to:

perform an inverse tangent operation on a quotient of the amount of change in the reactance of the sense coil divided by the amount of change in the resistance of the sense coil; and determine a type of the object based on a result of the inverse tangent operation coinciding with a predetermined range of values corresponding to the type of the object.

11. The apparatus as described in claim 10, wherein if the result of the inverse tangent operation comprises an angle that is approximately 45 degrees, the sensitivity of the detection circuit is increased to detect that the object is a ferromagnetic wire-like object or a non-critical object.

12. A method for detecting an object, the method comprising:

detecting, by a detection circuit, an amount of change in a reactance of a sense coil from a reference reactance value for the sense coil;

detecting, by the detection circuit, an amount of change in a resistance of the sense coil from a reference resistance value for the sense coil;

selectively increasing a sensitivity of a detection circuit as a ratio of the amount of change in the resistance and the amount of change in the reactance of the sense coil approaches a value of one, the sensitivity increased by reducing a detection threshold by an amount that is a function of the ratio; and detecting a presence of the object based on a relationship between the amount of change in the reactance of the sense coil and the amount of change in the resistance of the sense coil.

13. The method as described in claim 12, wherein the object is determined to have a length that is substantially longer than a thickness of the object.

14. The method as described in claim 12, wherein the object is a conductive ferromagnetic object.

15. The method as described in claim 12, wherein the detection circuit is configured to use at least two separate inductive sense loops.

16. The method as described in claim 12, further comprising ceasing inductive power transfer responsive to detecting the presence of the object.

17. The method as described in claim 12, wherein:
the reference reactance value for the sense coil includes a reactance of the sense coil when no object is present; and
the reference resistance value for the sense coil comprises a resistance of the sense coil when no object is present.

18. Non-transitory computer-readable media comprising code that, when executed, causes an apparatus for detecting an object to:

determine that an amount of change in reactance of a sense coil from a reference reactance value for the sense coil is substantially equal to an amount of change in resistance of the sense coil from a reference resistance value for the sense coil;

adjust a sensitivity of a detection circuit based on the determination, the adjustment including a selective increase in the sensitivity of the detection circuit as a ratio of the amount of change in the resistance of the sense coil and the amount of change in reactance of the sense coil approaches a value of one, the sensitivity increased based on a reduction to a detection threshold by an amount that is a function of the ratio; and detect a presence of the object based on a relationship between the amount of change in the reactance of the sense coil and the amount of change in the resistance of the sense coil.

19. The computer-readable media as described in claim 18, wherein the object is determined to have a length that is substantially longer than a thickness of the object.

20. The computer-readable media as described in claim 18, wherein the object is a conductive ferromagnetic object.

21. The computer-readable media as described in claim 18, wherein the sense coil and the detection circuit are implemented in a wireless electronic vehicle charging system.

22. The computer-readable media as described in claim 18, wherein the sense coil comprises an inductive sensing coil that generates a magnetic field.

23. The computer-readable media as described in claim 18, wherein:
the reference reactance value for the sense coil includes a reactance of the sense coil when no object is present; and
the reference resistance value for the sense coil comprises a resistance of the sense coil when no object is present.

24. An apparatus for detecting an object, the apparatus comprising:

means for determining that an amount of change in a resistance of a sense coil from a reference resistance value of the sense coil is substantially equal to an amount of change in a reactance of the sense coil from a reference reactance value of the sense coil;

means for selectively increasing a sensitivity of a detection circuit based on a determination that the amount of change in the resistance of the sense coil is substantially equal to the amount of change in the reactance of the sense coil, the sensitivity of the detection circuit increased as a ratio of the amount of change in the resistance of the sense coil and the amount of change in the reactance of the sense coil approaches a value of one, the sensitivity increased by reducing a detection threshold by an amount that is a function of the ratio; and means for detecting a presence of the object based on a relationship between the amount of change in the reactance of the sense coil and the amount of change in the resistance of the sense coil.

25. The apparatus as described in claim 24, further comprising means for determining that the object includes a length substantially longer than a thickness of the object.

26. The apparatus as described in claim 24, the object is a conductive ferromagnetic object.

27. The apparatus as described in claim 24, wherein the sense coil comprises an inductive sensing coil that generates a magnetic field.

28. The apparatus as described in claim 24, wherein the sense coil and the detection circuit are implemented in a wireless electronic vehicle charging system.

29. The apparatus as described in claim 24, wherein:
the reference reactance value for the sense coil includes a reactance of the sense coil when no object is present; and
the reference resistance value for the sense coil comprises a resistance of the sense coil when no object is present.

* * * * *